J. P. METZGER.
COUPLING.
APPLICATION FILED JUNE 19, 1916.

1,217,804.

Patented Feb. 27, 1917.

WITNESSES
Edw. Thorpe

INVENTOR
Jules P. Metzger
BY
ATTORNEYS

UNITED STATES PATENT OFFICE.

JULES P. METZGER, OF CARLSTADT, NEW JERSEY, ASSIGNOR TO THE LESLIE COMPANY, OF LYNDHURST, NEW JERSEY.

COUPLING.

1,217,804.  Specification of Letters Patent.  Patented Feb. 27, 1917.

Application filed June 19, 1916. Serial No. 104,515.

*To all whom it may concern:*

Be it known that I, JULES P. METZGER, a citizen of the United States, and a resident of Carlstadt, in the county of Bergen and State of New Jersey, have invented a new and Improved Coupling, of which the following is a full, clear, and exact description.

The invention relates to couplings such as shown and described in the Letters Patent of the United States, No. 1,186,021, granted to me on June 6, 1916.

The object of the invention is to provide a new and improved coupling more especially designed for coupling a supply pipe to the injector of a locomotive and arranged to enable the engineer to readily manipulate the locking device for locking or unlocking the key section of the locking ring.

In order to accomplish the desired result, use is made of a coupling nut having an internal groove, a locking ring made in sections, of which one is the key section, the said locking ring being adapted to be seated on either the front or rear wall of the groove, and means for holding the said locking ring in place and allowing it to assume either of the said positions.

A practical embodiment of the invention is represented in the accompanying drawings forming a part of this specification, in which similar characters of reference indicate corresponding parts in all the views.

Figure 1:
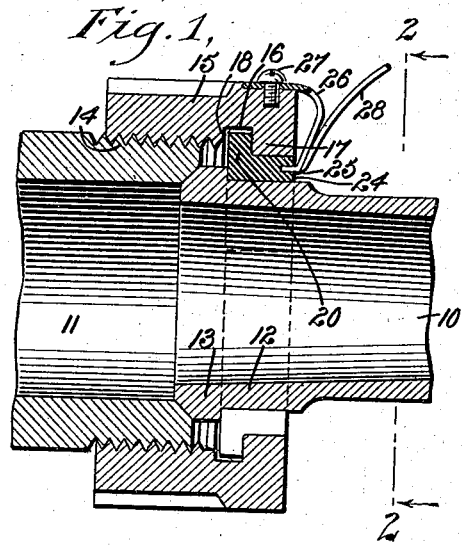
Figure 1 is a longitudinal central section of the coupling provided with the improvement, the section being on the line 1—1 of Fig. 2.
Figure 2:
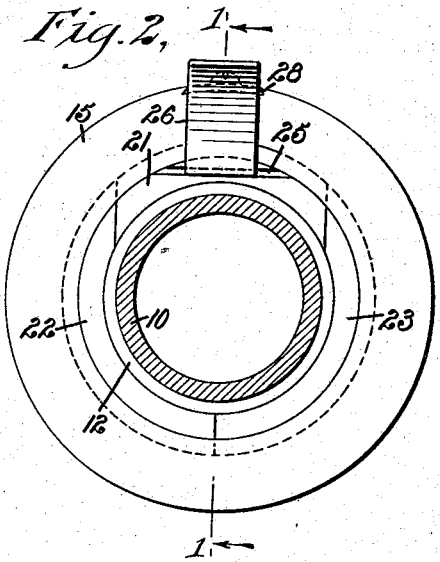
Fig. 2 is a cross section of the same on the line 2—2 of Fig. 1.

The member 10 to be coupled to the member 11 is provided at its coupling end with a head 12 having a shoulder 13 and the member 11 is provided with an external screw thread 14 on which screws the coupling nut 15. The outer end of the coupling nut 15 is provided with an internal annular groove 16 thereby providing an inwardly extending flange 17 and a shoulder 18 adjacent the inner end of the screw thread of the nut 15. A locking ring 20 fits onto the head 12 and is adapted to abut against the shoulder 13 and the said locking ring 20 is formed of sections 21, 22 and 23, of which the section 21 is the key section and serves to hold the other sections in place. When the nut 15 is screwed up or unscrewed then the locking ring 20 moves in a longitudinal direction with the nut 15. When the nut 15 is unscrewed and the locking ring 20 is moved off the head 12 then the key section 21 can readily drop out to permit of removing the locking ring for the time being, that is, until the repairs are made. Normally, however, the locking ring is fastened in place in the nut 15 and for this purpose the following arrangement is made: The locking ring 20, shown in Figs. 1 and 2, is provided with an outwardly extending flange 24 fitting into the outer opening of the nut 15. The outer face of the flange 24 of the key section 21 is provided with a recess 25 into which projects the free end of a spring 26 secured by a screw 27 to the nut 15. In the construction disclosed the attaching end of the spring 26 fits into a dovetail groove 28 formed in the peripheral face of the nut 15 so that the screw 27 in conjunction with the dovetail groove holds the spring 26 securely in position on the nut 15. The spring 26 is provided with a handle 28 adapted to be taken hold of by the operator for conveniently manipulating the spring 26 with a view to engage the free end thereof with the recess 25 or disengage it therefrom. The spring 26 tends to exert a lengthwise and outward pressure against the key section 21 of the locking ring to securely hold the same in place. It is understood that when the nut 15 is in unscrewed position the locking ring 20 abuts against the shoulder 18 and when the nut 15 is screwed up and it finally abuts against the shoulder 13 then a further screwing up of the nut 15 causes the disengagement of the locking ring 20 from the shoulder 18 while the flange 17 moves in engagement with the said locking nut, as illustrated in Fig. 1. When it is desired to remove the locking ring 20 it is necessary for the engineer to unscrew the nut 15 and to then disengage the spring 26 from the groove 25 to allow removal of the sections 21, 22 and 23 of the locking ring 20.

Figure 3:
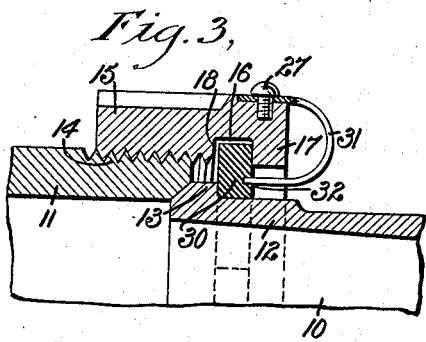
Fig. 3 is a longitudinal central section of a modified form of the coupling.

In the modified form shown in Fig. 3, the sectional ring 30 is without the flange or hub 24, and the spring 31 engages a recess 32 in the outer face of the key section of the locking ring 30, but otherwise the construction is the same as above described in reference to Figs. 1 and 2 so that further description is not deemed necessary.

Figure 6:
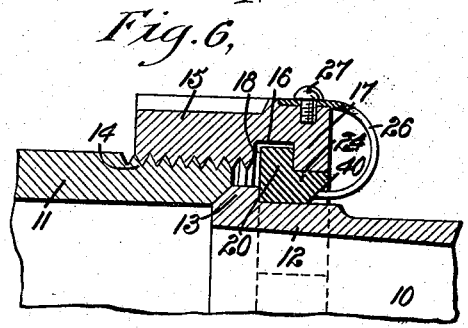
Fig. 6 is a longitudinal central section of another modified form of the coupling.

In the modified form shown in Fig. 6, the construction is practically the same as the one shown in Figs. 1 and 2 with the exception that instead of the recess 25 in the key section 21 of the locking ring, use is made of a bevel 40 engaged by the free end of the spring 26 for the latter to exert a lengthwise and outward pressure on the key section of the locking ring.

Figure 4:
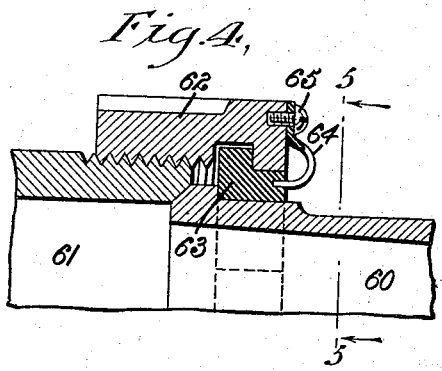
Fig. 4 is a similar view of another modified form of the coupling, the section being on the line 4—4 of Fig. 5.
Figure 7:
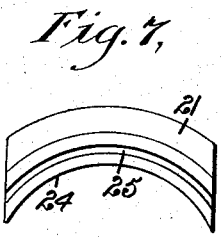
Fig. 7 is a face view of the key section of the locking ring.
Figure 8:
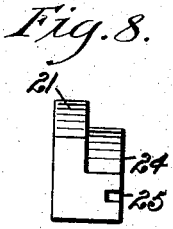
Fig. 8 is an edge view of the same.
Figure 5:
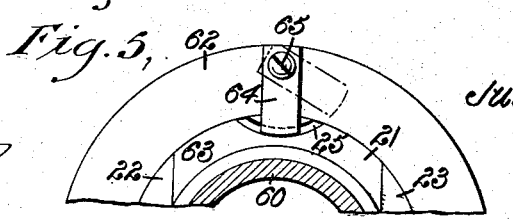
Fig. 5 is a cross section of the same on the line 5—5 of Fig. 4.

In the modified form shown in Figs. 4 and 5, the construction of the coupling members 60 and 61, the nut 62 and the locking ring 63 is the same as above described in reference to Figs. 1 and 2, while the spring 64 is pivoted on a screw 65 screwing in the outer face of the nut 62 to permit of swinging the spring 64 to one side (see dotted lines in Fig. 5) whenever it is desired to remove the locking ring 63 from the nut 62.

From the foregoing it will be seen that by the arrangement described the engineer can readily unfasten the key section to allow removal of the sectional ring from the coupling nut whenever it is desired to disconnect the parts for repairs or other purposes. In a like manner, the section of the locking ring can be readily assembled and placed in position on the nut and held in place therein by the spring.

Having thus described my invention, I claim as new and desire to secure by Letters Patent:

A coupling, comprising a coupling nut provided with an internal groove thereby providing an inwardly extending flange and a shoulder adjacent the screw thread of the nut, a locking ring made in sections, of which one is the key section, the said locking ring engaging the said groove and being narrower than the groove, the said locking ring in one position being seated on the said flange and in another position being seated on the said shoulder, the said locking ring having a sleeve extending in the opening of the nut and slidable lengthwise therein, and a spring attached to the said nut and engaging the outer end of the said sleeve, the said spring exerting an outward and lengthwise pressure on the said ring to hold the ring against the said shoulder at the time the nut is unscrewed.

JULES P. METZGER.